United States Patent [19]

Schwarz

[11] Patent Number: 4,732,178
[45] Date of Patent: Mar. 22, 1988

[54] LOOM

[75] Inventor: Erwin Schwarz, Hindwil, Switzerland

[73] Assignee: Sulzer Brothers Limited, Switzerland

[21] Appl. No.: 939,133

[22] Filed: Dec. 8, 1986

[30] Foreign Application Priority Data

Dec. 17, 1985 [CH] Switzerland .................. 05368/85

[51] Int. Cl.$^4$ ............................. D03D 47/30
[52] U.S. Cl. ................................. 139/435; 384/40;
384/41; 384/42
[58] Field of Search ............ 139/435, 188 R; 384/40, 384/41, 42

[56] References Cited

U.S. PATENT DOCUMENTS 3,700,292 10/1972 Owens .
3,813,132 5/1974 Sham ................................. 384/42

FOREIGN PATENT DOCUMENTS 0122087 10/1984 European Pat. Off. .
1575470 1/1970 Fed. Rep. of Germany ........ 384/40
3614705 11/1986 Fed. Rep. of Germany ...... 139/435
1551284 11/1968 France .
2098357 3/1972 France .
2345610 10/1977 France .

Primary Examiner—Henry S. Jaudon
Attorney, Agent, or Firm—Burns, Doane, Swecker & Mathis

[57] ABSTRACT

A device for securing cloth-forming parts to the sley (1) of a loom comprises, to receive fixing screws (4), a clamping element (51, 52) in the form of a slide block. The clamping element bears directly on the sley on only one side of a plane which extends parallel to sley length and through the axes of the screws. Consequently, the securing elements (4, 51, 52) can be introduced preassembled into the corresponding groove (15) in the sley (1), so that assembly is rapid. Depending on the construction of the device it has the advantage over known solutions of the problems of simpler fabrications and low mass of the sley holder.

7 Claims, 3 Drawing Figures

LOOM

RELATED APPLICATION

The subject matter of this application is related to the subject matter of U.S. application Ser. No. 939,034 of Erwin Schwarz filed concurrently herewith.

BACKGROUND

The invention relates to a device for securing parts, such as auxiliary air nozzles, to the sley of a loom, the device comprising at least one slide block and a screw, the same extending through one part of be secured and being screwed into the slide block, the same being disposed in a groove or channel in the sley.

In the development of looms having high picking rates achieved by high working frequencies, it is especially important that the rhythmically reciprocated elements be of very reduced mass. This applies more particularly to the sley and the parts secured thereto for picking and beating-up of the weft. However, the associated securing elements must be easy to control if loom downtimes are to remain short.

In modern machines the reed or, for example, the auxiliary nozzles in the case of air picking is or are usually received in a continuously drawn light metal section member to which such parts must be releasably connected. U.S. Pat. No. 4,489,762 illustrates a sley formed with continuous grooves to receive securing elements. The grooves are adapted to receive T-section slide blocks as nuts for fixing screws. In other sleys without slide blocks, the sley is formed in its cross-section with tapped apertures which are relatively expensive to drill and may readily be damaged. In the kind of securing used in the United States patent specification, the assembly of the reed and auxiliary nozzles calls for some skill on the part of the operatives when the fixing screws are introduced into the tapped apertures into the readily displaceable slide blocks. This operation is correspondingly time-consuming. Another disadvantage of the solution known from the United States patent specification is the relatively large amount of material needed for the trapezoidal-section guide grooves for the reed and auxiliary nozzles and for the T-groove below.

BRIEF DESCRIPTION OF THE INVENTION

It is an object of this invention to obviate the disadvantages of known solutions by providing a securing device which enables preassembled elements to be inserted rapidly into the sley and which is also compact and cheap. According to the invention, therefore, the slide block is in the form of a clamping element having a clamping surface on only one side of a plane which extends through the screw axis parallel to sley length, the slide block bearing by way of such surface directly on the sley against the pull. Preferably, the clamping element is in the form of a member which is prismatic in the direction of sley length. Because of this construction a rapidly formable and securely fitting screwed connection is provided which is also compact. In assembly and servicing work, the clamping element and the clamping screw for securing a cloth-forming part can be introduced into the sley as a preassembled unit, since the internal width of the sley groove as measured transversely to the direction in which the clamping element is pushed in is larger than the corresponding width of the clamping element.

BRIEF DESCRIPTION OF THE DRAWINGS

Various embodiments of the invention will be described hereinafter with reference to the Figures wherein.

DETAILED DESCRIPTION OF PREFERRED EMBODIMENTS

Figure 1:
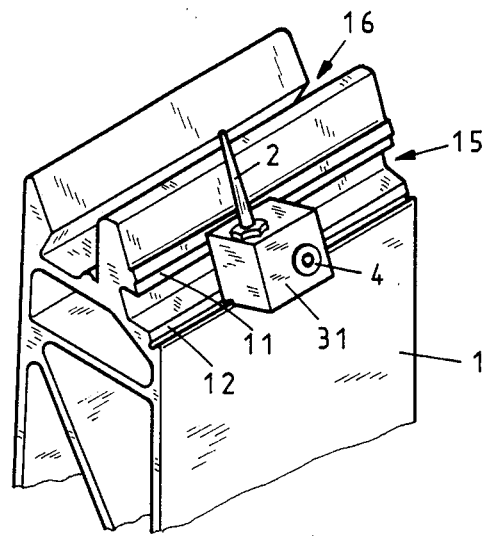
FIG. 1 is a perspective view of a part of a sley 1 having secured to it an auxiliary nozzle 2 disposed in a nozzle holder 31.
Figure 2:
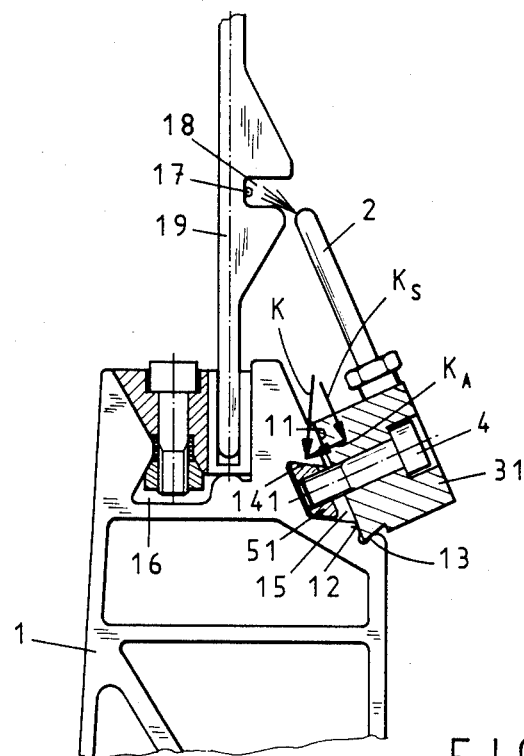
FIG. 2 is a corresponding view of the sley in the longitudinal direction with a nozzle holder in cross-section and with securing elements according to the invention.

An air jet issues at intervals from auxiliary nozzle 2 in FIG. 2 towards weft duct 18 of reed 19, the same being received in groove 16 and held therein by means described more fully in the aforesaid U.S. application Ser. No. 939,034 of Erwin Schwarz filed concurrently herewith. The entire disclosure of said application is incorporated herein by reference.

A part 31, such as a nozzle holder, is disposed on support surfaces 11, 12 on opposite sides of a groove 15 in the sley and is retained by a clamping screw 4 screwed into a clamping element 51. The grove 15 has an open mouth at the location of the sley surfaces 11 and 12, an inner end 20 opposite said mouth, and a wall portion 141 inwardly of the mouth of the groove and facing said inner end 20. The clamping element 51 is received in a groove 15 and bears on the sley by way of a clamping surface 141 of the sley. The same forms an acute angle with the axis of the screw 4. As shown in FIG. 2, the clamping element 51 has a cross-sectional configuration substantially in the shape of a parallelogram, and one slanted wall 21 of the parallelogram constitutes the clamping surface of the clamping element 51. The wall portion 141 of the groove 15 constitutes the clamping surface of the sley which cooperates with the clamping surface 21 of the clamping element 51.

Because of the preloading or biasing provided by the screw 4, the clamping surface 141 reacts with a force K on the clamping element 51. This force can be broken down into components $K_A$ and $K_S$. The fit between the upper body portion of the screw member 4 and the surrounding hole in the holder 31 permits the force component $K_S$ to be transmitted to the holder 31. The head of the screw member 4 is located within a recess in the holder 31 and bears against the bottom wall of such recess to transmit the force component $K_A$ to the holder 31. Consequently, the nozzle holder 31 is pressed on to the surfaces 11, 12 with the 10 force $K_A$ and on to bearing surface 13 of the sley with the force $K_S$. Friction forces have been neglected in this consideration.

Hence, it will be seen that when the screw 4 is tightened, the nozzle holder 31 with the nozzle 2 is simultaneously pressed on to the surfaces 11, 12 and aligned relatively to the surface 13. Alignment of all the auxiliary nozzles on a sley relatively to a reference surface—in this case the surface 13—is important for weaving because the air jet from the auxiliary nozzle 2 is then aimed accurately on the weft yarn 17 to be picked in the weft channel 18.

The nozzle holder 31 is brought preassembled with the screw 4 and clamping element 51 to the sley. When the nozzle holder 31 with the nozzle 2 is placed on the sley, the clamping screw 4 needs only slight slackening to enable the clamping element 51 to be introduced into the groove 15. In this regard, it will be seen from FIG. 2 that the size and shape of clamping member 51 relative to the groove or channel 15 is such that the clamping member 51 may be inserted readily into the open mouth of the groove 15, in this case by a movement that is in a direction extending approximately horizontally to the left in FIG. 2. The direction of the pull exerted by the screw member 4 on the clamping member 51 is not coincident with this insertion direction, but is rather disposed at an angle thereto. With the illustrated arrangement, a secure clamping action on one side of the screw axis can be achieved even though easy assembly is assured by reason of the ability to thread the screw 4 and the clamping member 51 together loosely before full access to the clamping member is inhibited as a result of its being located within the groove 15.

Figure 3:
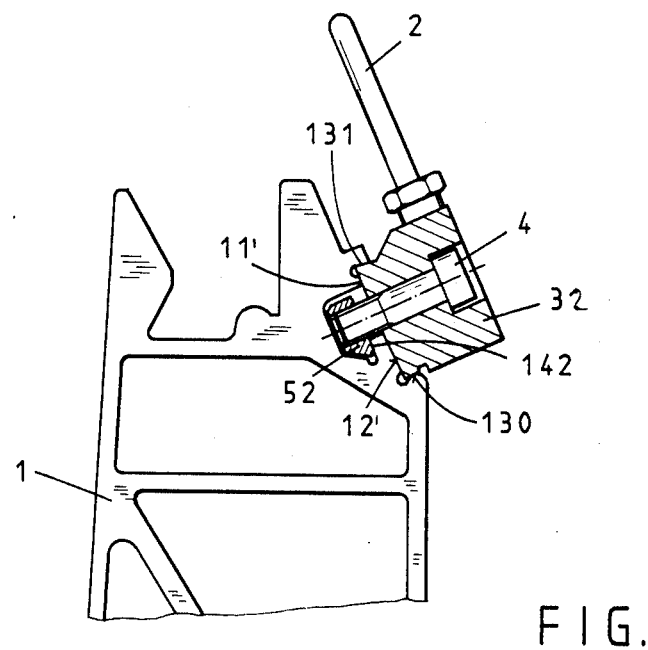
FIG. 3 is a view in the same direction but with other securing elements according to the invention.

FIG. 3 shows a variant of the invention. Unlike the clamping element 51, a clamping element 51 is drawn onto a sley surface 142 which is generally parallel to the support surfaces 11' and 12' of the sley 1. In this construction there is no force component operative parallel to the support surfaces 11', 12', and so guide surfaces 130, 131 are necessary to guide nozzle holder 32 laterally.

It is to noted that the parts 32, 4 and 52 do not have to be separated from one another for assembly and demounting with respect to the groove in the sley. The width of the open mouth of the groove is sufficient to permit direct insertion of the clamping member 52 into the groove. Such insertion is accomplished at a time when the screw 4 has been rotated in a slackening direction to provide an increased space between the nozzle holder 32 and the clamping member 52. After the initial insertion movement of the clamping member 52 generally in the direction of the axis of the screw 4 has been completed, the assembly is then shifted in a transverse direction with respect to the length of the groove in the sley to position a portion of the clamping member 52 behind the overhanging lip which provides the clamping surface 142 on the sley. Subsequent tightening of the screw 4 produces a clamping action which is effective on one side (i.e., the side facing said overhanging lip) of the axis of the screw but not on the other.

The described constructions in accordance with the invention ensure rapid and accurate assembly of the nozzle on the sley. Although the embodiments illustrated in the drawings have been described in detail, variations and modifications are possible, it is intended that the scope of the invention will be ascertained from the following claims.

What is claimed is:

1. A loom comprising a sley having a groove therein provided with an open mouth, an inner end opposite said mouth, and a wall portion inwardly of said mouth facing toward said inner end; a part adapted to be disposed on said sley outwardly of said mouth of said groove in position to bear on said sley; a rotatable screw operably connected to said part and extending into said groove; and a clamping element connected to said screw and adapted to be inserted through said mouth into said groove and having its only clamping surface portions located on only one side of a plane which extends through the screw axis parallel to the length of the sley, said clamping surface bearing outwardly on said wall portion of said groove upon rotation of said screw to draw said clamping element toward said part.

2. A device for securing to a loom sley having a longitudinal groove therein a part extending exteriorly of said groove, said device comprising at least one clamping element adapted to be disposed in said groove in the sley, and a screw operably connecting said clamping element to said part to be secured to said sley so that said part and said clamping element can be pulled axially toward one another by rotation of said screw, said clamping element having thereon only one clamping surface which clamping surface is located on one side of a plane which extends through the screw axis parallel to sley length and bears directly on the sley against the pull of said screw.

3. A device according to claim 2, wherein said clamping element has a cross-sectional configuration substantially in the shape of a parallelogram.

4. A device according to claim 3, wherein one slanted wall of the parallelogram circumscribing the cross-section of the clamping element contacts said clamping surface.

5. A loom comprising a sley having a groove therein provided with an open mouth, an inner end opposite said mouth, and a wall portion inwardly of said mouth facing toward said inner end; a clamping element adapted to be inserted through said mouth into said groove and having a surface for bearing outwardly on said wall portion of said groove; a part adapted to be disposed on said sley outwardly of said mouth of said groove in position to bear on said sley in a direction having a component extending oppositely with respect to the direction in which said surface of said clamping element bears against said wall portion of said groove; and means adjustably connecting said part to said clamping element and being operable to draw said clamping element toward said part.

6. A loom according to claim 5 wherein said means adjustably connecting said part to said clamping element comprises a rotatable screw operably connected to said part and said clamping element so that the spacing between said part and said clamping element may be changed from a first condition, in which said clamping element is far enough from said part to permit insertion of said clamping element through the mouth of said groove, to a second condition in which said part and said clamping element are so close together that said surface of said clamping element bears firmly against said wall portion of said groove and said part bears firmly against said sley to lock said part in position on said sley.

7. A loom according to claim 6 wherein air jet means are provided for inserting the weft threads being interwoven with the warp threads, wherein there are a plurality of said parts each of which serves as a holder for an auxiliary nozzle constituting a component of said air jet means, wherein there are a number of said clamping elements and screws corresponding to said plurality of said parts, wherein said groove is in a forwardly facing portion of said sley and an alignment surface is provided on said sley in position to be contacted by each of said parts to assist in providing the auxiliary nozzle with the proper orientation.

* * * * *